United States Patent [19]

Kinsell et al.

[11] 4,444,018

[45] Apr. 24, 1984

[54] HEAT PUMP SYSTEMS FOR RESIDENTIAL USE

[75] Inventors: Robert C. Kinsell, Los Angeles; James C. Noe, Canoga Park, both of Calif.

[73] Assignee: The Garrett Corporation, Los Angeles, Calif.

[21] Appl. No.: 414,233

[22] Filed: Sep. 2, 1982

Related U.S. Application Data

[62] Division of Ser. No. 172,631, Jul. 25, 1980, Pat. No. 4,347,714.

[51] Int. Cl.³ .................................................. F25B 9/00
[52] U.S. Cl. .......................................... 62/87; 62/402; 165/62
[58] Field of Search ............. 237/11, 12, 50, 81; 62/86–88, 238.2, 324.2, 401, 402, 501, 510; 165/62

[56] References Cited

U.S. PATENT DOCUMENTS 3,878,692 4/1975 Steves .............................. 62/402 X
4,295,518 10/1981 Rannenberg ........................ 165/62

Primary Examiner—Lloyd L. King
Attorney, Agent, or Firm—Albert J. Miller

[57] ABSTRACT

An air conditioning system of the air cycle heat pump type for selectively heating and cooling a residence or similar space environment. In one embodiment, a combustor and associated Brayton cycle turbine provide the primary drive to a compressor constituting the heat pump. In a second embodiment, the Brayton turbine is replaced by an electric motor coupled to drive the compressor shaft. An auxiliary turbine is also coupled to the drive shaft to provide auxiliary drive derived from the operation of a portion of the system at sub-atmospheric pressure. In this portion, during the cooling mode, water is evaporated into the system to further assist in cooling by removing the latent heat of vaporization.

16 Claims, 7 Drawing Figures

HEAT PUMP SYSTEMS FOR RESIDENTIAL USE

This is a division of application Ser. No. 172,631 filed July 25, 1980, now U.S. Pat. No. 4,347,714.

BACKGROUND OF THE INVENTION

1. Field of the Invention

This invention relates to systems for space heating and cooling and, more particularly, to such systems particularly adapted to provide improved efficiency for residential use.

2. Description of the Prior Art

Heat pumps have long been used for efficiently transferring heat from one medium to another, thus permitting the heating or cooling of a given space with the heat being transferred from some readily available medium (ambient air, water in an adjacent lake or well, a body of rocks or salt, or the like) for heating, and being delivered to the medium (often the same body of water, etc.) for cooling.

For example, the Carleton U.S. Pat. No. 3,135,318 describes a heat pump system using a turbo-compressor which provides power and waste heat to a standard vapor cycle refrigeration system. Two turbines are employed in the system, one driving the turbo-compressor and a second turbine driving a recirculating air fan and the refrigerant compressor.

The Miller U.S. Pat. No. 3,822,561 describes a self-contained, portable air cooling unit comprising a refrigeration circuit, a thermal reservoir consisting of an ice bank in a flexible tank, and a heat exchanger for transferring heat between the air in the space to be cooled and chilled water circulated from the ice bank and reservoir. Means are provided to selectively and alternatively operate the refrigeration circuit and the circulating system to heat or to cool the space as desired.

The Lodge U.S. Pat. No. 3,407,620 describes a system for heating and cooling using a recirculating water loop. Heating is supplied by a standard heater using combustible fuel, and cooling is provided by a cooling tower. Although the patent represents the system as a heat pump, it is not a heat pump by the usual thermodynamic definition.

The La Fleur U.S. Pat. No. 3,355,903 describes a closed reverse-Brayton-cycle refrigeration system to provide refrigeration for air liquefaction. Repetitive stages of compression and cooling are employed.

A heat-actuated space conditioning system utilizing a Brayton engine is described in an article entitled "Light Commercial Brayton/Rankine Space Conditioning System" by David Friedman, beginning at page 172 of the August, 1977 Proceedings of the 12th IECEC (Intersociety Energy Conversion Engineering Conference). This article describes a Brayton cycle system utilizing a combustor driving a turbo-compressor, the latter being magnetically coupled to a second compressor in an associated Rankine cycle system.

Such systems as are known may provide improved efficiency over the standard air conditioning system including a furnace for heating and a refrigeration type air conditioner for cooling, but the cost of such a heat pump system is generally substantially greater because of the increased complexity. However, with the recent substantial increases in the cost of fuel, it becomes more worthwhile, indeed essential, to develop systems of improved efficiency.

The present invention is directed to the provision of a simplified heat pump system of improved efficiency for selectively heating or cooling a residential space in a temperate zone region where extreme low and high temperatures are seldom encountered.

SUMMARY OF THE INVENTION

In brief, arrangements in accordance with the present invention incorporate a turbo-compressor, a pair of heat exchangers, and suitable control valves in a basic reverse-Brayton-cycle heat pump adapted for residential use. The control valves may be adjusted to cause the system to operate in either a heating or a cooling mode. High efficiency is achieved by, among others, regeneratively heat exchanging with inlet ambient air and expanding the ambient air through a turbine prior to exhaust. In addition, other waste heat from the system is used in heating the conditioned space.

In one arrangement in accordance with the invention, a recuperated Brayton cycle engine is mounted on a common shaft with the aforementioned turbo-compressor to provide the primary drive. In this embodiment, the Brayton engine uses a heat source in the form of a combustor and heat exchanger adapted to burn natural gas. An additional sink heat exchanger is provided and arranged, in the heating mode, to add the waste heat from the drive portion of the system to the air for the residential conditioned space.

In a second embodiment, the primary source of driving power is provided by an electric motor coupled to the shaft of the turbo-compressor. In the heating mode, air is directed through a heat exchanger coupled to the motor so that motor heat is added to the air supplied to the load heat exchanger for the conditioned space.

In both embodiments, the Brayton cycle portion of the system is operated at sub-atmospheric pressure. In the cooling mode, advantage is taken of this condition to provide additional cooling through the injection of water spray into the low pressure side of the load heat exchanger. Evaporation of water is enhanced because of the sub-atmospheric pressure level, and additional cooling is effected through the removal of the latent heat of vaporization.

Because the working fluid for both the Brayton cycle engine and the Brayton conditioning cycle is air, the two systems can share a common compressor.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENTS

Figure 1:
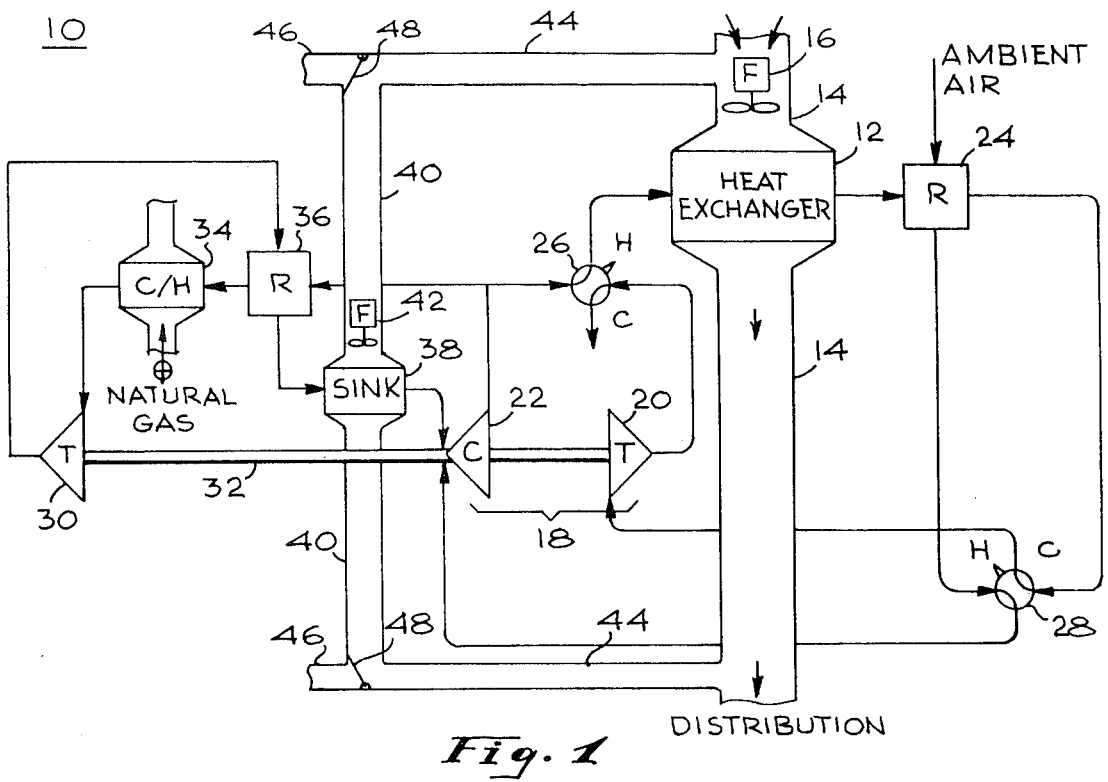
FIG. 1 is a schematic diagram illustrating one particular arrangement of a heat driven heat pump in accordance with the invention shown in the heating mode.
Figure 2:
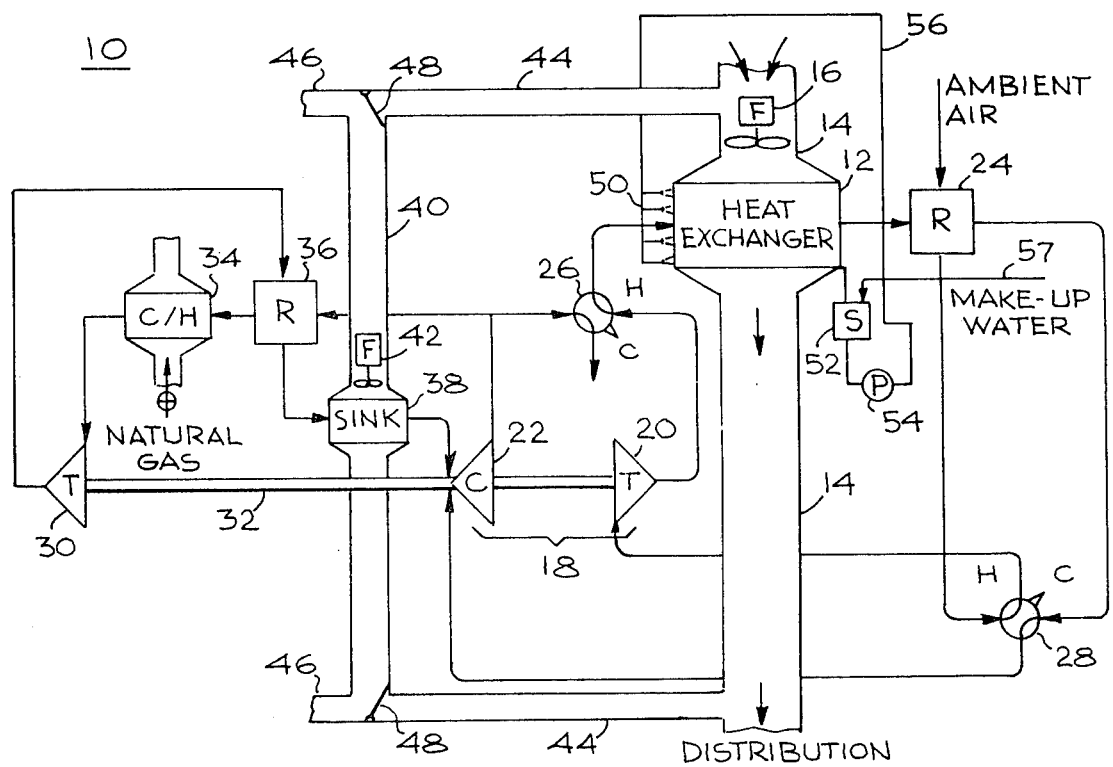
FIG. 2 is a schematic diagram illustrating the arrangement of FIG. 1 for operation in the cooling mode.

FIGS. 1 and 2 represent schematically a heat-driven, air cycle heat pump system 10 in accordance with the invention, particularly adapted for residential use. In these figures, the system 10 is shown comprising a load heat exchanger 12 connected to ducting 14 through which air to be heated or cooled is driven by a fan 16.

The air cycle, or Brayton cycle, portion of the system 10 comprises a turbo-compressor 18 having a turbine 20 and compressor 22 interconnected with a regenerative heat exchanger 24 for ambient air and the load heat exchanger 12 via heat/cool control valves 26, 28.

The drive portion of the system 10 is shown comprising a Brayton cycle turbine 30 coupled on a common shaft 32 with the turbo-compressor 18 and connected to receive heated air from a combustor/heat exchanger 34 fed by natural gas. The exhaust of the turbine 30 is fed to a second regenerative heat exchanger 36 from whence it passes to a sink heat exchanger 38 connected in an air duct 40 having a fan 42. The duct 40 is connected via ducting 44 to the main air duct 14 and by ducting 46 to outlets for ambient air. Dampers 48 are provided to select the path for air flowing through the duct 40.

As shown in FIG. 1, the valves 26, 28 and the dampers 48 are positioned for operation of the system in the heating mode. In this mode, cold ambient air ducted from outside the house is first heated in the regenerative heat exchanger 24 to near the temperature of the heated space and then is directed through valve 28 to the common compressor 22. This air is mixed with air from the sink heat exchanger 38 and compressed by the compressor 22. The temperature of the compressed air is raised well above that required for the heated space and a portion is ducted through valve 26 to the load heat exchanger 12 where it provides the heat for the recirculated air. This air then returns through the regenerative heat exchanger 24, providing the source of heat for the ambient air, and thus is cooled to near ambient temperature. Next it passes through the valve 28 to the turbine 20 where it is expanded to a temperature well below ambient and is exhausted to ambient through the valve 26. This expansion process in the turbine 20 provides a portion of the energy needed to drive the compressor 22. The remaining energy is provided by the Brayton turbine 30.

Air from the sink heat exchanger 38 is mixed with the preheated ambient air at the inlet of the compressor 22 where it is compressed and a portion is directed through the recuperator 36 and combustor/heat exchanger 34, where the temperature is increased to approximately 1500 degrees F. The air is then expanded across the turbine 30 to provide the remaining energy to drive the compressor 22. The air leaving the turbine 30 then passes through the recuperator 36 and the sink heat exchanger 38. A portion of the recirculated air from the duct 14 passes via ducts 44 and 40 through the sink heat exchanger 38 to add the waste heat from the Brayton engine drive portion of the system 10 to the recirculated air as additional heating.

FIG. 2 shows the system of FIG. 1 for operation in the cooling mode. The various components of the system are shown with the same reference numerals and are the same as depicted in FIG. 1 with the exception that the valves 26, 28 and the dampers 48 are changed to the cool positions, and a water spray system (omitted from FIG. 1 for simplicity) is shown. The water spray system comprises a spray unit 50 at the inlet of the cool side of the heat exchanger 12 and water recirculation is provided by a sump 52 and pump 54 through recirculating line 56. A water make-up line 57 is also provided.

In the operation of the arrangement of FIG. 2 for cooling residential space air, warm ambient air is first cooled in the regenerative heat exchanger 24 to near the temperature of the conditioned space and then is directed to the turbine 20 where it is expanded to sub-atmospheric pressure. The temperature of the ambient air is thus decreased well below the temperature of the conditioned space. The expansion energy provides a portion of the energy required to drive the compressor 22. The remainder of the energy will be provided by the Brayton turbine 30, as previously described.

After leaving the turbine 20, the cooled air is directed through the heat exchanger 12 to provide the cooling for the conditioned space. The air is then directed through the regenerative heat exchanger 24 and the valve 28 to the inlet of the compressor 22 where it is mixed with air from the sink heat exchanger 38. Waste heat removed by the sink heat exchanger 38 is ducted to atmosphere via the ducts 40, 46, as propelled by the fan 42. Air from the inlet of the compressor 22 is compressed back to ambient pressure and the portion not returned to the drive portion of the system is exhausted to atmosphere through the valve 26.

In the cooling mode, the inlet of the compressor 22 is sub-atmospheric, and thus the Brayton cycle engine must operate in the closed mode. Starting at the inlet of the compressor 22, the air is compressed and directed through the recuperator 36 and combustor/heat exchanger 34 where the temperature is increased to about 1500 degrees F. The air is then expanded across the turbine 30 to provide the necessary energy to drive the compressor 22. The hot turbine discharge air is now directed through the recuperator 36 and the sink heat exchanger 38.

The water evaporation from the spray unit 50 within the load heat exchanger 12 provides a significant additional cooling in the system. The chamber is flooded for maximum evaporation; excess water is drawn off in the sump 52. Any condensation from ambient air may also be used in the spray system.

Figure 3:
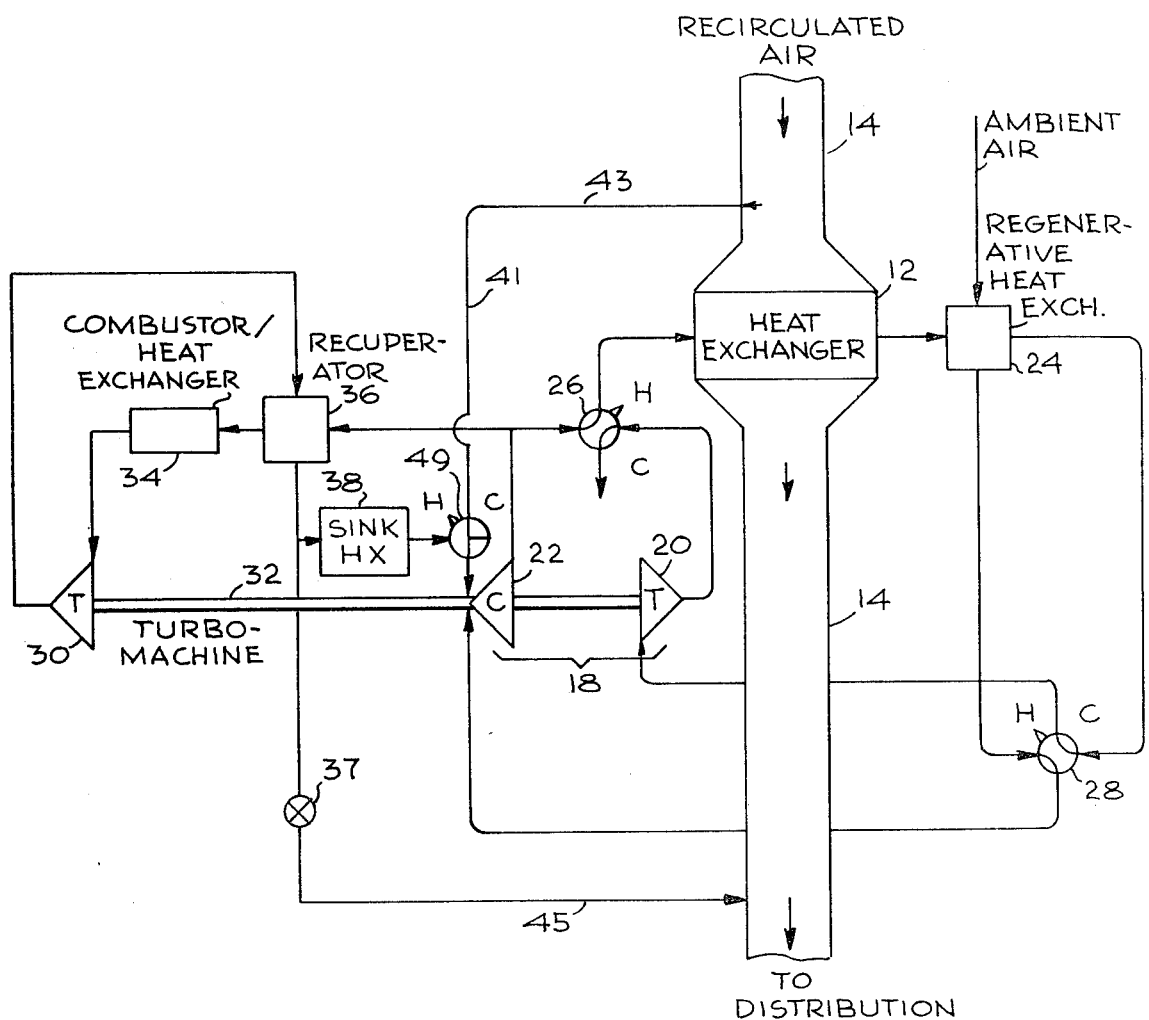
FIG. 3 is a schematic diagram showing a variation of the system of FIGS. 1 and 2.

In a variant of the arrangements of FIGS. 1 and 2, shown schematically in FIG. 3, the waste heat from the recuperator 36 is introduced to the recirculated air duct in a somewhat different fashion. In FIG. 3, in which like elements have been given like reference numerals, the auxiliary heat ducting 40, 44 has been replaced by ducts 41, 43 and 45. Ducts 43 and 41 interconnected to the inlet of the compressor 22 via a valve 49 at the outlet of the sink heat exchanger 38. Duct 45 extends from the inlet side of the heat exchanger 38 (recuperator 36 outlet) to the downstream side of the air circulation duct 14 to transmit air from the recuperator 36 directly into the air circulation return. A valve 37 is provided in the duct 45 to block backflow into the sub-atmospheric cycle during operation in the cooling mode.

In the heating mode operation as shown in FIG. 3, auxiliary air from the recirculation duct 14 is taken off upstream of load heat exchanger 12 and passes via ducts 43, 41 and the valve 49 directly to the inlet side of the compressor 22. Valve 49 blocks the outlet of the sink heat exchanger 38 so that no air passes through the exchanger 38. Instead, the air from the recuperator 36, which is still at an elevated temperature and possesses substantial heat, passes to the air circulation return 14 by way of the duct 45. In the heating mode, this air provides about 60% of the heating capacity for the system. Except for this variation, the operation of the system of FIG. 3 is the same as previously described for FIG. 1 in the heating mode. In the cooling mode, the valve 49 is turned so as to block air flow through the ducts 41 and 43 and to direct air from the sink heat exchanger 38 to the compressor 22. In the cooling mode, no air flows through the duct 45.

Figure 4A:
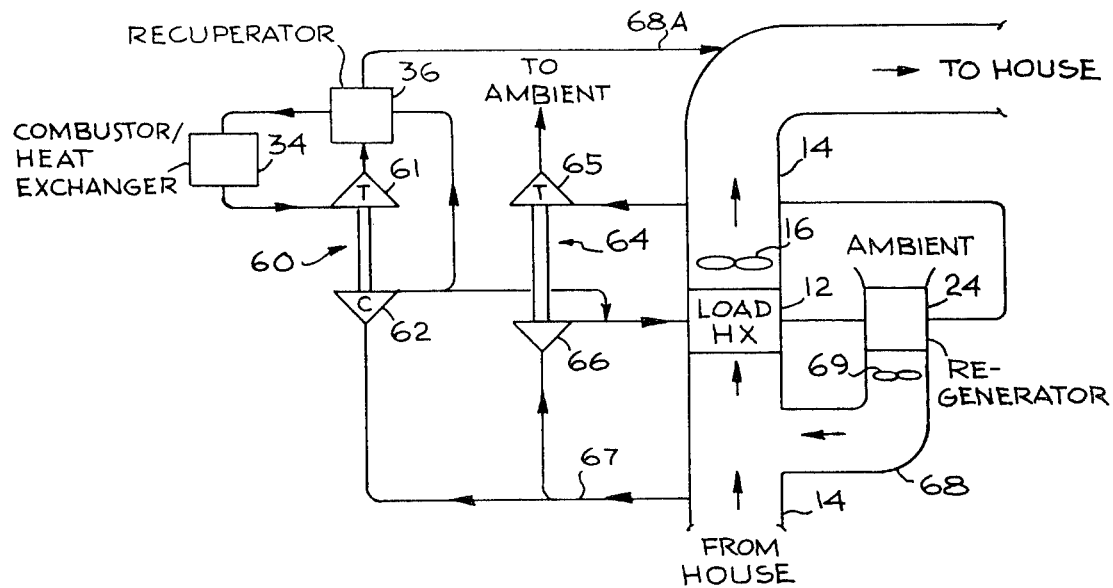
FIGS. 4A and 4B are schematics illustrating another arrangement of the invention in the heating and cooling modes, respectively.
Figure 4B:
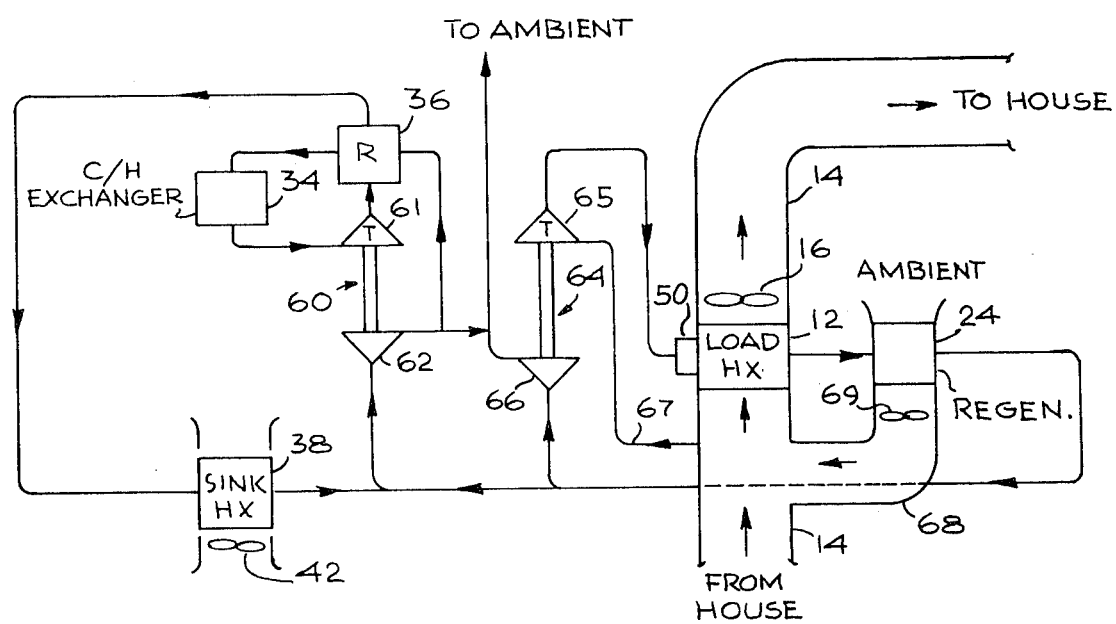

Still another variation of the heat-driven air-cycle heat pump of the present invention is illustrated schematically in FIGS. 4A and 4B. This is essentially like the arrangement of FIG. 3 except that a pair of turbo-compressors are provided in place of the single three-wheel turbo machine of FIG. 3. In the schematic diagrams of FIGS. 4A and 4B, the transfer valves have been omitted for the sake of simplicity.

FIGS. 4A and 4B represent the operation of the dual turbo-compressor system in the heating and cooling modes, respectively. As depicted, the system includes a pair of turbo-compressors 60, 64. The unit 64 is in the Brayton cycle heat pump portion of the system which is driven pneumatically by the Brayton power cycle portion of the system, comprising the turbo-compressor 60. As a further modification, ducting 68, including fan 69, is provided to introduce ambient air into the recirculation air for the house after the ambient air passes through the regenerator 24.

In this arrangement, both the power and conditioning cycle compressors 62, 66 take in house air as the cycle working fluid. The air is compressed with a consequent increase in temperature, and about 40% of the power cycle air from compressor 62 is added to the conditioning cycle at the outlet of the compressor 66. This high pressure air eventually expands through the conditioning cycle turbine 65—after passing through the load heat exchanger 12 and the regenerator 24—to provide the power that drives the conditioning cycle turbomachine 64. In this process, the conditioning cycle air is cooled to near house air temperature by the recycled house air in the load heat exchanger 12. The house air in turn gains heat and is ducted back to the house at an elevated temperature to provide heating. In passing through the regenerator 24, the cycle air is cooled by ambient air coming into the house, which in turn is heated to approximately the temperature of the house and is mixed with the house return air via duct 68. This fresh air replaces the conditioned cycle air which is leaving the house and preserves air flow balance within the house.

The cycle air at the conditioned air turbine 65 expands to ambient pressure and is released to atmosphere. The power generated by the turbine 65 drives the compressor 66.

After the approximately 40% of the power cycle air is bled off to the outlet of the compressor 66, as described above, the remaining 60% passes through the recuperator 36 and combustion heat exchanger 34 where it is heated to its maximum temperature. This air is then expanded through the power cycle turbine 61, generating the power to drive the power cycle compressor 62. This air is still hot and passes through to the other side of the recuperator 36 and is returned to the house via the auxiliary return duct 68A which joins the main return duct 14. The sink heat exchanger 38 is not utilized in the system when in the heating mode corresponding to FIG. 4A.

When the two transfer valves (see FIG. 1) are rotated to switch from heating to cooling, thus developing the system configuration as shown in FIG. 4B, the conditioning cycle also shifts from pressurized operation to sub-atmospheric. A comparison of FIGS. 4A and 4B indicates that the power cycle air is routed through the power cycle turbomachinery as before, but the conditioning cycle air now goes through the turbine 65 first, instead of the compressor 66. The conditioning cycle air is taken from the house via duct 67 and expanded through the turbine 65 to sub-atmospheric pressure where the work of expansion causes a drop in air temperature. Next, water is sprayed into the lower pressure air by a spray head 50 at the input to the load heat exchanger 12. This water evaporates to remove the heat of vaporization from the house air in the load heat exchanger 12. Because of the low sub-atmospheric pressure, the air will hold more water than normal, and the evaporative cooling capability of the cycle air is increased. The recirculated house air in turn is cooled by the cycle air, and any excess moisture condenses on the downstream side of the load heat exchanger 12. This moisture, along with a minor amount of makeup water, is used for the water spray supply (not shown). The regenerator 24 then cools the ambient air introduced into the house to replace the air expelled from the house by the cycle. Any condensation from the ambient air is also used for the spray system 69.

The low pressure air is next pumped up to ambient levels by the two compressors 62, 66. The power generated by the conditioning cycle turbine 65 is enough to pump about 50% of the cycle flow, and the power cycle compressor 62 compresses the remainder, along with the power cycle turbine flow. Thus, the power cycle in this arrangement provides pneumatic power by evacuating the low pressure side of the conditioning cycle. The conditioning cycle air, compressed to atmospheric pressure by the compressors 62, 66, is vented to ambient.

Because in the cooling mode the cycle is run at sub-atmospheric pressure, the Brayton power cycle must be run in a closed loop. Therefore the discharge air from the turbine 61, after passing through the recuperator 36, is cooled by the sink heat exchanger 38 before returning to the power cycle compressor inlet. In the cooling mode, none of the power cycle air enters the house, and the cooling is provided by the conditioning cycle portion only.

Figure 5:
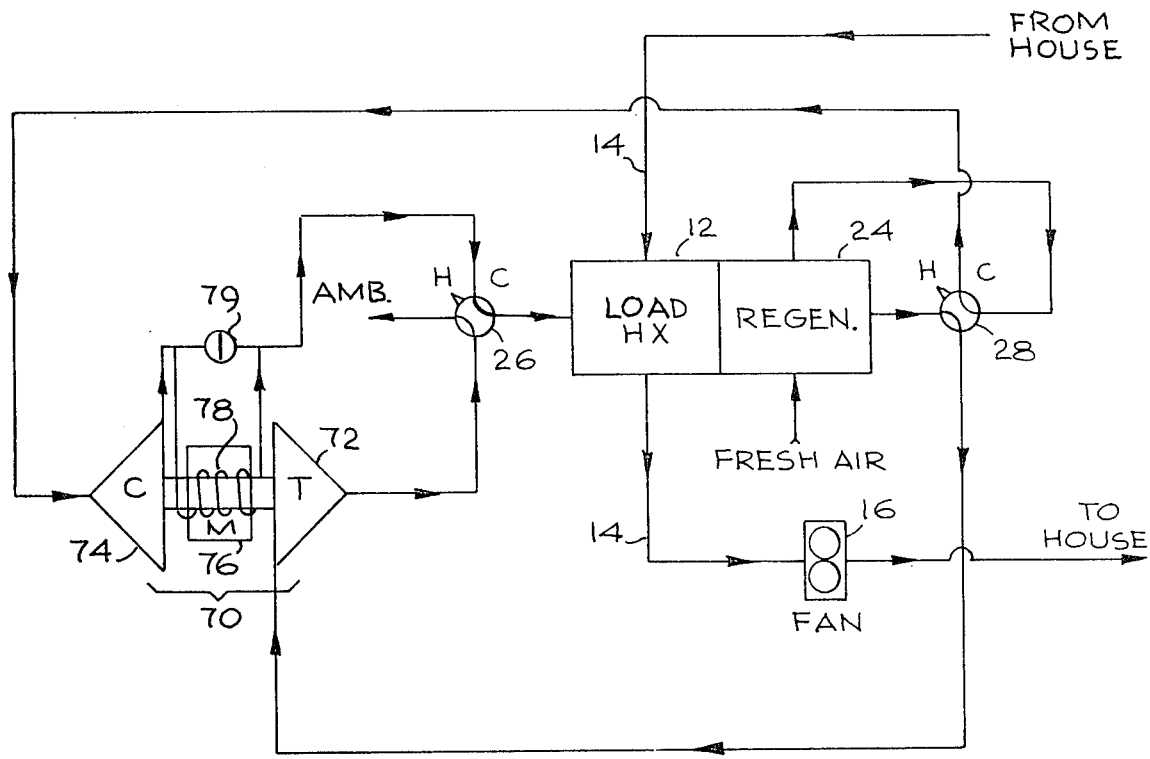
FIG. 5 is a schematic diagram of an arrangement of an electrically driven heat pump in accordance with the invention, shown for operation in the heating mode.
Figure 6:
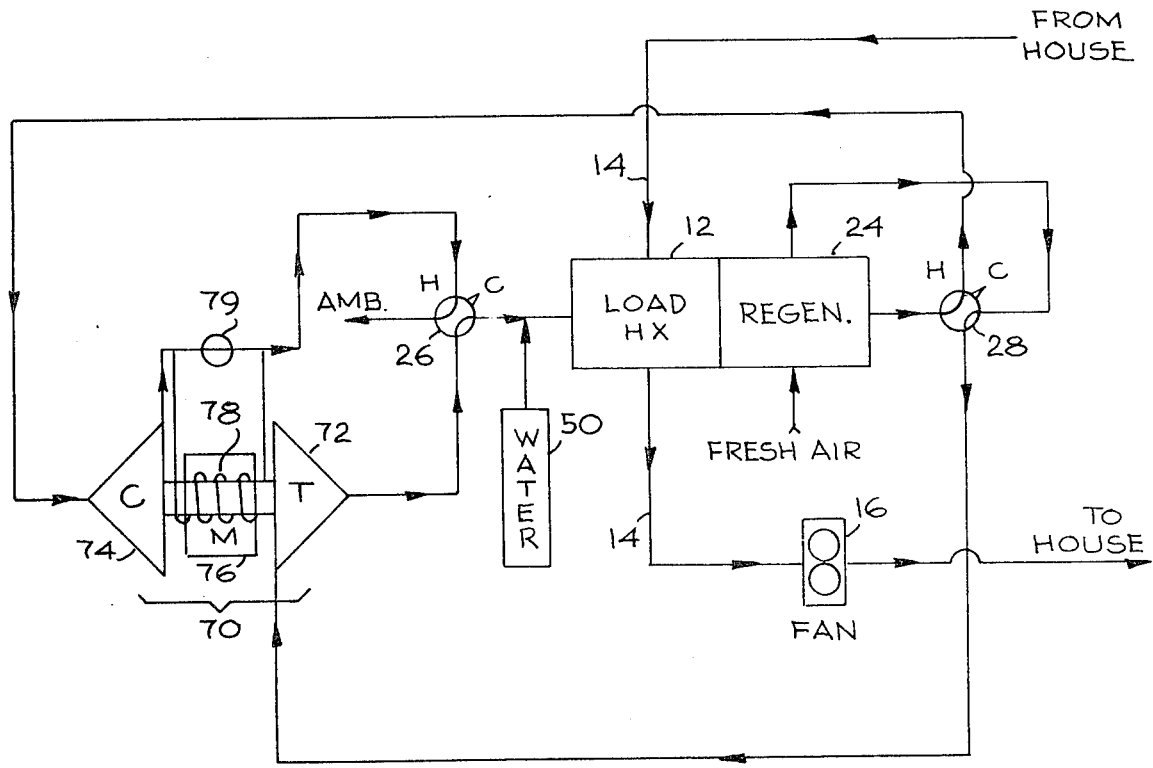
FIG. 6 is a schematic diagram of the arrangement of FIG. 5, shown for operation in the cooling mode.

FIGS. 5 and 6 illustrate schematically an electrically driven heat pump system in accordance with the invention which is essentially the same as the systems depicted in FIGS. 1–3 except that an electric motor is substituted for the primary drive which was supplied by a Brayton cycle turbine in the heat driven systems. Thus FIGS. 5 and 6 use corresponding reference numerals to designate corresponding elements which are common to the arrangements of FIGS. 1–3. This electrically driven system includes a turbo-compressor 70 comprising turbine 72 and compressor 74 as the conditioning cycle turbomachine. Mounted on the turbo-compressor shaft is an electric motor 76, shown for connection to electric mains and controlled by a suitable control circuitry (not shown). The motor 76 includes a heat exchange element 78 in the form of a coil carrying air from the compressor 74. A by-pass valve 79 is mounted in the outlet line from the compressor 74 and, for the heating mode operation as shown in FIG. 5, is in the blocked position.

As shown in FIG. 5, cold ambient air ducted from outside the house is first heated in the regenerative heat exchanger 24 to near the temperature of the heated space and is then ducted through valve 28 to the compressor 74. The air is then compressed and its temperature is raised well above that required for the heated space and is ducted through the load heat exchanger 12 where it provides the heat for the recirculated air. It then returns through the regenerative heat exchanger 24, is cooled to near ambient temperature, and is then expanded across the turbine 72 to a temperature well below ambient and is exhausted through the valve 26. This expansion process provides a portion of the energy required to drive the compressor 74. The remaining energy is provided by the electric motor 76. The air from the compressor 74 passes through the loop 78, cooling the motor 76 and picking up the motor heat for further heating of the house circulation air in the load heat exchanger 12.

In the cooling mode, depicted in FIG. 6, the electrically driven heat pump system operates to initially cool the warm ambient air in the regenerator 24. This air then flows to the turbine 72 where it is expanded to sub-atmospheric pressure. The temperature decreases well below the temperature of the conditioned space and this cooled air draws heat from the circulation air in the load heat exchanger 12. Water is injected at the inlet of the load heat exchanger 12, as already described, for further cooling due to evaporation of the water. As before, the expansion energy at the turbine 72 provides a portion of the energy required for the compressor 74. The remainder of the necessary energy is provided by the electric motor 76. Cycle air from the regenerator 24 is directed to the compressor 74 where it is compressed back to ambient pressure and is exhausted through valve 26.

If desired, the system of FIGS. 5 and 6 may be modified along the lines shown and described for the system of FIG. 3 to divert a portion of the recirculation air through the cooling element associated with the motor 76 so that the waste motor heat is transferred directly into the recirculation air.

By virtue of the various arrangements in accordance with the present invention as shown in the accompanying drawings and described hereinabove, a particularly effective and efficient heat pump system for residential use may be realized. Each of the various components incorporated in the systems are readily available, off-the-shelf items. For example, the recuperator (and other heat exchanger components, as desired) may utilize structure corresponding to the formed plate type heat exchanger of U.S. Pat. No. 4,073,340 of Kenneth O. Parker, assigned to the Assignee of this invention. The combustor may correspond to that described in the above-mentioned article by Friedman. The coefficient of performance (COP), as defined by Friedman, compares favorably with the COP of existing systems, with which the systems of the present invention are designed to compete. In one embodiment of the heat driven air cycle heat pump, the system is estimated to have a heating COP of approximately 1.6 on a 45° F. day (in the heating mode). It is worth noting that as the ambient temperature falls below 45° F., this system does not have a reduction in total heating capacity, as is common with conventional vapor compression equipment. In addition, the heating COP will also not diminish to any great extent. Another important advantage of this system is the fact that, since the ambient air is heated in the regenerated heat exchanger, there is no frost problem commonly associated with vapor compression equipment. In the cooling mode, the system is capable of achieving a COP of 0.8, which is improved to a value exceeding 1.0 through the utilization of the water spray technique as shown in FIG. 2.

Systems in accordance with the present invention, when compared with existing installed gas furnaces and electrical air conditioning systems have been estimated to have a favorable pay-out time, by virtue of their improved efficiency and reduced operating costs, of five to ten years. With economies to be realized from higher volume production, and at the presently high and apparently increasing cost of fuel, the pay-out time from economy of operation should reduce substantially.

Although there have been described above specific arrangements of heat pump systems for residential use in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. The method of operating an enclosed space conditioning system having a load heat exchanger for exchanging heat between recirculation air and conditioned air comprising the steps of:

directing conditioned air from the load heat exchanger to a regenerator for exchanging heat with inlet ambient air to bring the ambient air to near the temperature of the residential space;

directing the conditioned air and the ambient air in separate paths to separate points in a turbo-compressor having a common shaft coupled to be driven by a primary power source, the primary power source comprising a combustor/heat exchanger and Brayton turbine, the Brayton turbine being coupled to drive the shaft;

directing conditioned air from the compressor of the turbo-compressor in a heating mode to the load heat exchanger to heat the recirculation air therein;

directing conditioned air from the regenerator in the heating mode to the inlet of the turbo-compressor for expansion therein to develop power to assist the primary power source in driving said shaft;

thereafter exhausting air from the turbine to ambient;

directing combustion heated gases from the combustor/heat exchanger to drive the Brayton turbine;

directing the Brayton turbine exhaust to a recuperator for transferring heat to inlet air for the combustor heat/exchanger; and thereafter directing the combustion heated gases to a sink heat exchanger for transferring waste heat to the residential space when in the heating mode.

2. The method of claim 1 further comprising the step of directing exhaust gases from the sink heat exchanger to the inlet of the compressor for combination with inlet ambient air, and thereafter directing conditioned air from the compressor to the recuperator and to the load heat exchanger respectively when operating in the heating mode.

3. The method of claim 1, when operating in the cooling mode, further comprising the steps of directing inlet ambient air from the regenerator to the turbine for expansion through the turbine to develop power to assist in driving the compressor, conditioning the air by expansion through the turbine to sub-atmospheric pressure levels, and thereafter directing the cool conditioned air to the load heat exchanger for providing cooling to the recirculation air.

4. The method of claim 3 further comprising the step of spraying water into the conditioned air at the load heat exchanger for evaporation therein to absorb the latent heat of vaporization and further cool the conditioned air.

5. The method of operating an enclosed space conditioning system having a load heat exchanger for exchanging heat between recirculation air and conditioned air comprising the steps of:
   directing conditioned air from the load heat exchanger to a regenerator for exchanging heat with inlet ambient air to bring the ambient air to near the temperature of the residential space;
   directing the conditioned air and the ambient air in separate paths to separate points in a turbo-compressor having a common shaft coupled to be driven by a primary power source, the primary heat source comprising a combustor/heat exchanger and a Brayton turbine, the Brayton turbine being coupled to said shaft to provide power for driving the compressor, directing combustion heated gases from the combustor/heat exchanger to the Brayton turbine and from there to a recuperator for heating inlet air to the combustor/heat exchanger, directing combustion heated gases from the recuperator to a sink heat exchanger for transferring waste heat from the combustion heated gases to outside ambient, directing the combustion heated gases from the sink heat exchanger to the inlet of the compressor for mixing with conditioned air from the regenerator, and directing compressed air from the compressor to the inlet portion of the recuperator and to outside ambient, respectively;
   directing conditioned air from the compressor of the turbo-compressor in a heating mode to the load heat exchanger to heat the recirculation air therein;
   directing conditioned air from the regenerator in the heating mode to the inlet of the turbo-compressor for expansion therein to develop power to assist the primary power source in driving said shaft;
   thereafter exhausting air from the turbine to ambient; and
   when operating in the cooling mode directing inlet ambient air from the regenerator to the turbine for expansion through the turbine to develop power to assist in driving the compressor, conditioning the air by expansion through the turbine to sub-atmospheric pressure levels, and thereafter directing the cool conditioned air to the load heat exchanger for providing cooling to the recirculation air.

6. The method of conditioning an enclosed space or the like comprising the steps of:
   taking in ambient air through a regenerator for exchanging heat with conditioned air from a load heat exchanger;
   directing the ambient air and the conditioned air to separate passages in a first mode select valve;
   directing air respectively from the first mode select valve to the inlet of a compressor coupled on a shaft to be driven by the turbine of a turbo-compressor and to the inlet of the turbine for expansion therein to develop power for driving the compressor;
   driving said shaft from a Brayton turbine coupled to a combustor/heat exchanger to develop primary power for the compressor;
   directing air from the compressor outlet and turbine outlet in separate passages to a second mode select valve; and
   directing air from the second mode select valve separately to the load heat exchanger and to ambient.

7. The method of claim 6 further comprising drawing a portion of the recirculation air from the residential space and introducing it to the compressor inlet for combination with the inlet ambient air in the heating mode, further heating the combined air by compression in the compressor and by passing it through the combustor/heat exchanger and thereafter returning heated air to the residential space.

8. The method of claim 6 further comprising the steps of setting the first and second mode select valves to select the heating mode, thereby directing compressed and heated conditioned air from the compressor to the load heat exchanger and exhausting cooled, expanded air from the turbine to ambient.

9. The method of claim 8 further comprising the steps of heating inlet ambient air in the regenerator to near the temperature of the residential space and thereafter heating the same air further by compression in the compressor before introduction of the compressed, heated air to the load heat exchanger.

10. The method of claim 6 further comprising the steps of setting the first and second mode select switches to select the cooling mode, thereby directing inlet ambient air to the turbine for conditioning by cooling and expansion therein to sub-atmospheric pressure levels, and thereafter directing the cooled air to the load heat exchanger.

11. The method of claim 10 further comprising the step of directing heated air from the compressor to outside ambient.

12. The method of providing conditioned air to an enclosed space comprising the steps of:
   exchanging heat between conditioning air from a load heat exchanger and ambient air in a regenerative heat exchanger;
   selecting between a heating mode of operation and a cooling mode of operation;
   in the heating mode of operating, directing heated ambient air to a compressor of a turbo-compressor to compress and further heat the air, directing the heated conditioning air through the load heat exchanger to heat the conditioned air to be provided to the enclosed space, and directing conditioning air from the regenerative heat exchanger to the turbine of the turbo-compressor to expand the conditioning air therein; and
   in the cooling mode of operation, directing cooled ambient air to the turbine of the turbo-compressor to expand and cool the air and directing the cooled conditioning air through the load heat exchanger to cool the conditioned air to be provided to the enclosed space.

13. The method of claim 12 further including the step of driving the turbo-compressor with a Brayton turbine receiving combustion gases from a combustor/heat exchanger.

14. The method of claim 13 further including the step of directing the Brayton turbine exhaust gases to a recuperator to transfer heat to inlet air for the combustor/heat exchanger.

15. The method of claim 14 further including the step of directing the turbine exhaust gases from the recuperator to a sink heat exchanger to transfer heat to the enclosed space in the heating mode.

16. The method of claim 15 further including the step of directing exhaust gases from the sink heat exchanger to the compessor of the turbo-compressor for combination with the heated ambient air.

* * * * *